Dec. 24, 1957

D. L. HILEMAN 2,817,803

DIRECT CURRENT VOLTAGE STEP-UP DEVICE

Filed Oct. 30, 1953

INVENTOR.
DALE L. HILEMAN
BY
ATTORNEY

United States Patent Office 2,817,803
Patented Dec. 24, 1957

2,817,803

DIRECT CURRENT VOLTAGE STEP-UP DEVICE

Dale L. Hileman, Cedar Rapids, Iowa, assignor to Collins Radio Company, Cedar Rapids, Iowa, a corporation of Iowa Application October 30, 1953, Serial No. 389,198

1 Claim. (Cl. 321—2)

This invention relates to direct current potential conversion apparatus and more particularly to that type of conversion apparatus which is characterized by a low voltage circuit containing a vibratory interrupter, a high voltage circuit and conversion means interposed which is effective to transform the voltage from one value to another.

Apparatus of this type finds extensive application as a high voltage power supply for electronic devices and may be used to replace a conventional battery supply or dynamotor supply. In many applications, particularly in portable equipment, high voltage battery supplies and dynamotors are of such weight and bulk as to militate against their use. Further, such conventional expedients are not economical in applications where the power requirements are relatively low.

Heretofore vibratory converters have been employed to produce a high voltage direct current from a low voltage source which employ a two-winding transformer as the means for changing the voltage level. Such equipment has been extensively used in commercial applications but is attendant with certain disadvantages. This type of conversion apparatus relies upon the turns ratio of the primary and secondary windings of the transformer to obtain a change in potential. While this is quite satisfactory from an operational standpoint, the transformer device is an expensive component of the equipment. Furthermore, it is a common practice to employ a rectifying device in the secondary of the transformer to obtain a unidirectional voltage output. Since the polarity of the high voltage induced in the secondary alternates, the rectifying device is subject to a high inverse peak voltage. This requires that the rectifier have a sufficient rating to withstand this inverse voltage or the life expectancy of the rectifier will be considerably shortened.

Accordingly, it is proposed to present a direct current voltage conversion method and apparatus which is not subject to the disadvantages of the conventional type of vibratory converters. It is therefore an object of this invention to present a converter which is effective to change a direct current potential from a relatively low value to a high value and which requires relatively few and inexpensive components.

It is a specific object of this invention to eliminate the necessity for a transformer having primary and secondary windings as the means for converting the voltage level.

Another object of this invention is to provide a vibratory converter having a rectifier in the high voltage circuit which is subject to a relatively low inverse peak voltage.

A further object is to present a direct current potential conversion apparatus and method which utilizes the transient properties of an electrical circuit to change the voltage level from a low value to a relatively high value.

It is another object to present a light weight, low-cost and efficient voltage converter for use as a power supply for portable radio receivers, bias supply for radio transmitters, and voltage supply in similar electronic equipment.

Further objects and advantages of the present invention will become apparent from the description which follows.

According to this invention, a direct current potential is changed to a different value by utilizing the transient characteristics of an electrical circuit. It is well known that a current flowing in an inductive circuit cannot be changed from one magnitude to another instantaneously; a finite period of time is required for the current value to change. By the present invention this property of an inductive circuit is utilized, by establishing a current of a given value in an inductor by a low voltage source, interrupting the low voltage source and simultaneously diverting the inductor current through a high voltage circuit. Voltage conversion is accomplished by providing the high voltage circuit with an impedance to the flow of current which is different from that in the low voltage circuit. The results is that the instantaneous voltage developed across the high impedance is proportional to the ratio of the impedance of the high voltage circuit to the impedance of the low voltage circuit.

The manner in which this principle is applied and the foregoing objects are attained is set forth with reference to the exemplary embodiments as shown in the accompanying drawings, in which.

Figure 1:
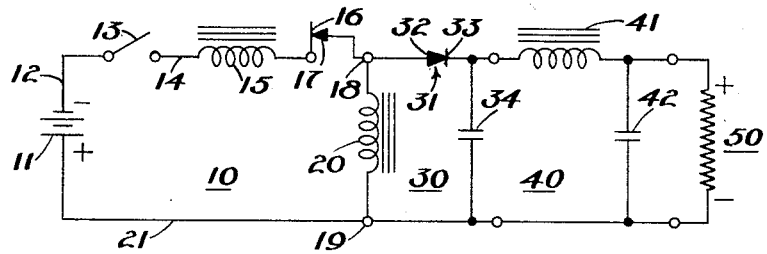
Figure 1 shows in schematic form one embodiment of the invention.

Referring now to the invention, as illustrated in Figure 1, the apparatus includes an input or low voltage circuit 10, an output or high voltage circuit 30 with a filter section 40 for supplying high voltage energy to a load device 50. In the low voltage circuit the low potential source of direct current shown for purposes of illustration is a battery 11 which is connected from its negative terminal through a conductor 12, switch 13 and conductor 14 to one terminal of the electromagnet winding 15. The other terminal of the electromagnet winding is connected to the fixed end of the vibratory reed carrying a movable contact 16. A fixed contact 17 is positioned opposite the movable contact and is connected to one terminal 18 of a two-terminal inductor 20. The other terminal 19 of the inductor is connected by a conductor 21 to the positive terminal of the low voltage source 11.

A unidirectional conducting device 31, illustrated as a rectifier, is connected by its forward terminal to one terminal 18 of the inductor 20. The backward terminal 33 of the rectifier 31 is connected to a storage capacitor 34. The other side of the capacitor is connected to the other terminal 19 of the inductor 20. This portion of the circuit constitutes the high voltage or output circuit 30.

In order to smooth the variations of the potential which appear in the high voltage circuit 30 prior to the application of this potential to the load, a filter section 40 is provided. Any suitable form of filter for this purpose may be included and as illustrated. one such form comprises an inductor or choke 41 connected to one terminal of the capacitor 34 and a capacitor 42 connected from the other terminal of the filter choke 41 to the other terminal of the storage capacitor 34.

The load which is supplied energy through the converter apparatus is illustrated as a resistor 50; however, the specific load is shown only for exemplary purposes. The actual load may consist of the plate supply for electron tubes or any other type of load which requires a high voltage direct current potential, and may be a complex impedance of combined inductance, capacitance and resistance.

The operation of the embodiment illustrated in Figure 1 is as follows: When the switch 13 is closed a circuit is established from the positive terminal of the battery 11 through the inductor 20 and through the normally closed contacts 16 and 17 of vibrator 15 to the negative terminal of the battery. Upon closure of this switch a current is established which increases in value according to an exponential law as well understood by those skilled in the art. Upon the current reaching a predetermined value, the electromagnet of vibrator 15 is sufficiently energized to attract the vibratory reed and separate the contacts 16 and 17, thus interrupting the low voltage circuit. During the period when the contacts were closed, a magnetic field linking the coil turns of inductor 20 was established by the current flowing through it. Upon interruption of this current the magnetic field collapses and induces a voltage in the inductor windings which will oppose any change of current flowing through the inductor according to Lenz's Law. When the flux field collapses a voltage is induced and appears across terminals 18 and 19. This voltage has a polarity which causes the current to continue to flow through the inductor in the same direction.

Since the low voltage circuit has been interrupted, the only remaining path for the current caused by the induced voltage across the terminals 18 and 19 includes the storage capacitor 34, the shunt-connected filter section 40, and the load impedance 50. The current flow is from the terminal 18 of the inductor through the forward contact 32 and the backward contact 33 of the rectifier 31 through the parallel combination of capacitor 34, shunt-connected filter 40, and load impedance 50, back to the terminal 19 of the inductor.

The magnitude of the voltage induced across the terminals of the inductor upon collapse of the magnetic field is a function of the ratio of the impedance of the output circuit to the impedance of the input circuit. A rigorous mathematical analysis of the circuit behavior is unduly complicated when the circuits include complex combinations of inductances, capacitances and resistors. However, an analysis based upon a specific form of the circuitry involved may be made in order to aid in understanding the circuit behavior.

Figure 2:
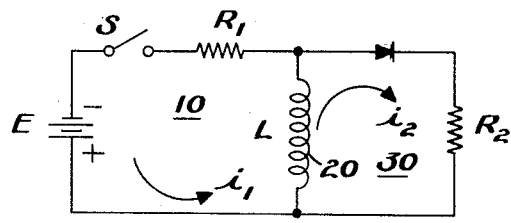
Figure 2 illustrates a specific circuit to aid in explaning the behavior of the circuit shown in Figure 1.

In Figure 2 is shown a circuit which is a specific form of that shown in Figure 1. An analysis of this circuit will serve to explain the behavior of the embodiment of the invention shown in Figure 1. Referring to Figure 2, assume that the switch S has been closed for a long period of time. The current in the input circuit 10 is:

$$i_1 = \frac{E}{R_1} \quad (1)$$

The current in the output circuit 30 is:

$$i_2 = 0 \quad (2)$$

since the polarity of the rectifier is such that it prevents current flow.

By Kirchhoff's Law the voltage equation for loop 30 may be written as follows:

$$L\frac{di_2}{dt} + R_2 i_2 = 0 \quad (3)$$

The solution to this differential equation is:

$$i_2 = K_1 \epsilon^{-\frac{R_2 t}{L}} \quad (4)$$

where $K_1$ is a constant of a value depending upon boundary conditions, $t$ is time, $L$ is inductance of 20 and $R_2$ is the load impedance.

If at time $t=0$ the switch S is opened, the current in loop 10 will become zero instantly. However, at the instant before opening the switch the current through 20 was $$\frac{E}{R_1}$$

and the current through an inductance cannot become zero without a finite time lapse since the energy stored in the magnetic field of the inductance must be dissipated upon collapse. Therefore the current through inductance 20 is diverted through the circuit loop 30. At the instant the switch is opened, $$i_2 = \frac{E}{R_1} \quad (5)$$

The value of the constant $K_1$ may be found at the time $t=0$ as follows from Equations 4 and 5:

$$\frac{E}{R_1} = K_1 \epsilon^{-\frac{R_2 t}{L}} \quad (6)$$

$$K_1 = \frac{E}{R_1}$$

and the expression for $i_2$ is:

$$i_2 = \frac{E}{R_1} \epsilon^{-\frac{R_2 t}{L}} \quad (7)$$

Substituting this in Equation 3 and solving for $$L\frac{di_2}{dt}$$

which expresses the instantaneous voltage across the inductor, yields:

$$e = L\frac{di_2}{dt} = -E\frac{R_2}{R_1} \epsilon^{-\frac{R_2 t}{L}} \quad (8)$$

At time $t=0$, the instantaneous value of the voltage across the inductance 20 is:

$$e = -E\left(\frac{R_2}{R_1}\right) \quad (9)$$

This equation shows that the peak value of the voltage across the inductance is proportional to $R_2/R_1$ which is the ratio of the resistance of the output circuit to the resistance of the input circuit. If this ratio is greater than unity a voltage conversion to a higher value will be obtained.

Generalizing from this specific case it appears that if the resistive circuit components are replaced by complex impedances including resistance, capacitance and inductance, then the voltage conversion realized would be proportional to the ratio of the instantaneous impedances of the output and input circuits. This generalization is supported by the behavior of the circuit of Figure 1.

Referring again to Figure 1, the voltage across the inductor 20 appears as a surge which has a peak value depending upon the ratio of output circuit impedance to input circuit impedance. The voltage across the inductor decreases exponentially at a rate determined by the output circuit impedance after the vibrator contacts 16 and 17 open. The result is a voltage across the inductor 20 which appears as spaced voltage surges or peaks when the input circuit is repetitively interrupted by the contacts 16 and 17.

Figure 3:
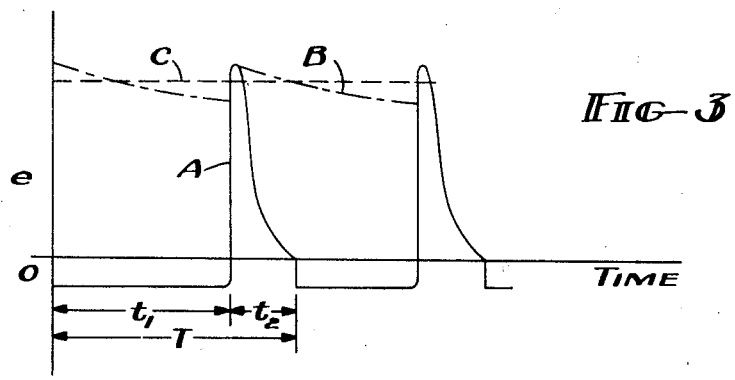
Figure 3 illustrates voltage wave forms produced in the high voltage circuit of the embodiment shown in Figure 1.

Figure 3 illustrates the approximate waveform of the voltage across the terminals of inductor 20 by the solid line A. Two cycles of operation of the interrupter 15 are shown after the system has been in operation for a period of time. The time for one cycle of the interrupter is T during which the contacts are closed for a period $t_1$ and are open for a period $t_2$. Until the time of interruption, $t_1$, the voltage across the inductor has one polarity. At interruption the collapse of the flux field induces an opposite polarity and the voltage curve crosses the zero axis and approaches the peak value very rapidly and then decreases exponentially.

In order to supply a load with a high voltage which is substantially constant during the entire cycle of operation, it is desirable to provide means for storing or accumulating the charge delivered by the high voltage surges from the inductor. Accordingly, the capacitor 34 in series with the rectifier 31 is connected across the inductor 20.

The effect of this is shown by the waveform B in Figure 3 which represents the voltage across the condenser 34. The rectifier 31 prevents the capacitor from discharging back through the inductor 20 after the peak voltage has subsided. Note that this voltage reaches a maximum value when the peak value of the inductor voltage is delivered to the capacitor. After the peak value is reached, the capacitor tends to discharge at a rate determined primarily by the load device to which current is delivered by the capacitor.

The resultant wave is somewhat sawtooth in shape. The load is supplied a substantially constant voltage providing the rate at which the capacitor is discharged is relatively low with respect to the rate at which the inductor is capable of supplying charge to the capacitor.

The discharge rate may be controlled by the value of impedance connected across the capacitor. The charging rate or the output of the system may be regulated within limits by varying the ratio of the interrupter contact make time, $t_1$, to the break time, $t_2$.

The voltage across the capacitor 34 is further smoothed prior to application to the load device by the filter section 40. The choke coil 41 serially connected with the load across the capacitor 34 tends to oppose a rapid increase in voltage during the voltage peak interval while the shunt condenser 42 tends to discharge during the low voltage portion of the cycle. The result is a waveform of substantially constant value as indicated by the line C in Figure 3.

It is apparent that the embodiment illustrated in Figure 1 is susceptible to a great many design changes in order to obtain a desired performance. One embodiment which has been built and tested included circuit components of the following description: The direct current potential source consists of a battery having a terminal voltage of approximately 10 volts. An interrupter is employed having an operating frequency of approximately 50 cycles per second. The rectifier 32 is a conventional selenium cell type rectifier. The remaining components are as follows:

Inductor 20—0.1 henry, 5.5 ohms
Storage capacitor 34—8 microfarads
Filter choke 41—19 henries
Filter condenser 42—8 microfarads With a resistive load of 5600 ohms, an output voltage is produced across the load terminals of 100 volts of substantially constant magnitude.

The electromagnet of the vibratory interrupter may be dispensed with if it is desired, by utilizing the magnetic field of the inductor across which the high voltage is produced, to actuate the vibrator contacts. Such a modification is illustrated in the embodiment as shown in Figure 4 to be described hereinafter.

Figure 4:
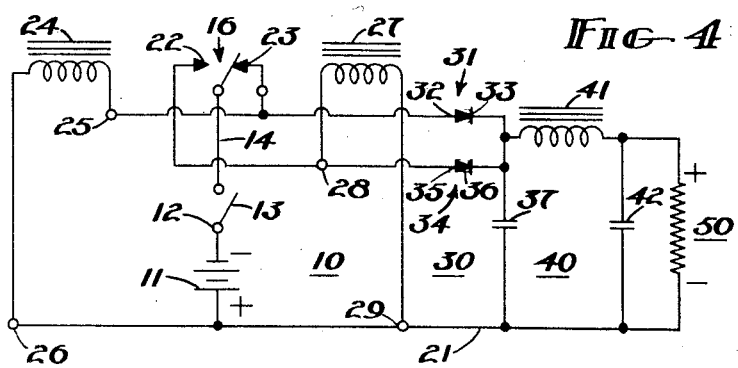
Figure 4 illustrates a modification of the invention in which energy is supplied from the low voltage source on both half cycles of operation of the vibratory interrupter.

In the embodiment of Figure 4 the apparatus is connected with a vibratory interrupter having two fixed contacts and two inductors for producing a high voltage in order that energy may be transferred to the high voltage circuit during both half cycles of the vibratory reed. The low voltage source 11 is connected with its negative terminal 12 connected through switch 13 to the fixed end of the vibratory reed 16 of the interrupter. As illustrated, the reed contact 16 is normally closed with fixed contact 23 and establishes a circuit from the battery through the inductor 24 back to the positive terminal of the battery. This constitutes the low voltage circuit during one half cycle. The corresponding high voltage circuit includes the terminals 25 and 26 of the inductor 24 and serially-connected rectifier 31 having a forward contact 32 and backward contact 33, the said rectifier and inductor being connected in series with the storage capacitor 37.

When the current flow in this low voltage circuit reaches a magnitude which sufficiently energizes the reed of the vibrator from the magnetic field of the inductor 24 to separate the contacts 16 and 23, the reed contact 16 is closed with oppositely disposed fixed contact 22. This establishes the low voltage circuit for the second half cycle of operation and includes the serial connection from the negative terminal of the battery 11 through switch 13, contacts 16 and 22, inductor 27, back to the positive terminal of battery 11. The corresponding high voltage circuit includes the inductor terminals 28 and 29 connected across the series combination of the rectifier 34 having forward contact 35 and backward contact 36 and the storage capacitor 37.

In the operation of the embodiment shown in Figure 4, the capacitor 37 is supplied with two high voltage surges during each cycle of operation of the vibrator 16. When the switch 13 is initially closed, current flow is established through inductor 24 and upon self-interruption of the contacts 16 and 23, a high voltage surge appears across terminals 25 and 26 to charge condenser 37 to peak value. Upon this interruption reed contact 16 engages contact 22 and a current is established in inductor 27, which upon self-interruption of the contacts 16 and 22, produces a second high voltage surge to charge condenser 37. In the manner described with respect to Figure 1, a filter section 40 is provided to provide a smoothing effect on the time varying voltage appearing across the terminals of condenser 37. A load represented by an impedance 50 is supplied with the substantially constant high voltage output through the filter section.

By the present invention there is provided a vibratory converter which employs a two-terminal inductance and the transient properties of the electric circuit as a means of producing a relatively high direct current potential. The voltage appearing across this inductor during the period when the interrupter contacts are closed is substantially that of low voltage source. The voltage appearing across the terminals of the inductor when the contacts are open is a value depending upon the impedance ratio of the circuits connected across the inductor terminals at the instant the magnetic field of the inductor starts to collapse. After the storage capacitor has been charged to its peak value, and during the interval when the interrupter contacts are closed, the voltage impressed across the terminals of the rectifier device is the algebraic sum of the voltages appearing across the low voltage circuit and the high voltage circuit. This reduces the requirement for the peak inverse voltage rating of the rectifier device.

A number of modifications and variations of this invention will now be apparent to those skilled in the art. The specific embodiments described are given only for illustrative purposes and in no sense are these embodiments to be construed as a limitation upon the scope of the invention. For definition of the scope, reference is to be had to the appended claim.

I claim:

Conversion apparatus for a direct current potential comprising a low voltage source, a vibratory interrupter having a movable contact normally in engagement with one of a pair of oppositely disposed fixed contacts, one side of said source connected to said movable contact, a first inductor for actuating said movable contact and having a pair of terminals, said one of said fixed contacts connected to one of said terminals, the other of said terminals connected to the other side of said source, a first rectifier and a capacitor serially connected across the terminals of said first inductor, a second inductor for actuating said movable contact and having a pair of terminals, one of said terminals of said second inductor connected to the other of said pair of fixed contacts, the other of said terminals of said second inductor connected to the said other side of said source, and a second rectifier serially connected with said capacitor across the terminals of said second inductor.

References Cited in the file of this patent

UNITED STATES PATENTS

| | | |
|---|---|---|
| 877,026 | Weintraub | Jan. 21, 1908 |
| 1,143,041 | Darby | June 15, 1915 |
| 2,330,500 | Leifer | Sept. 28, 1943 |
| 2,439,860 | Peek | Apr. 20, 1948 |

OTHER REFERENCES

Electric Transients, Magnusson, Kalin, Tolmie, 1922, pp. 34–37.